Patented Feb. 2, 1932

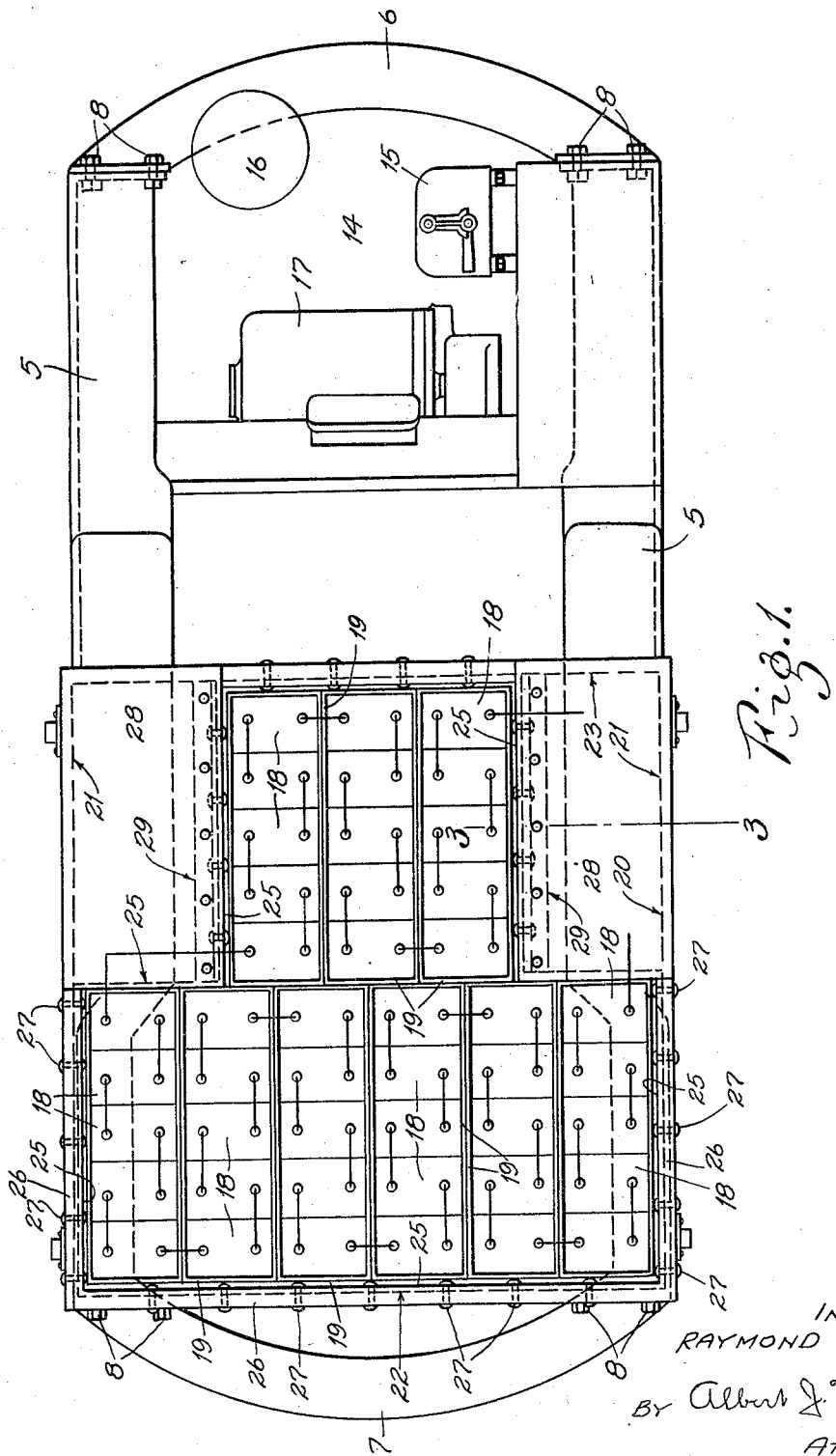

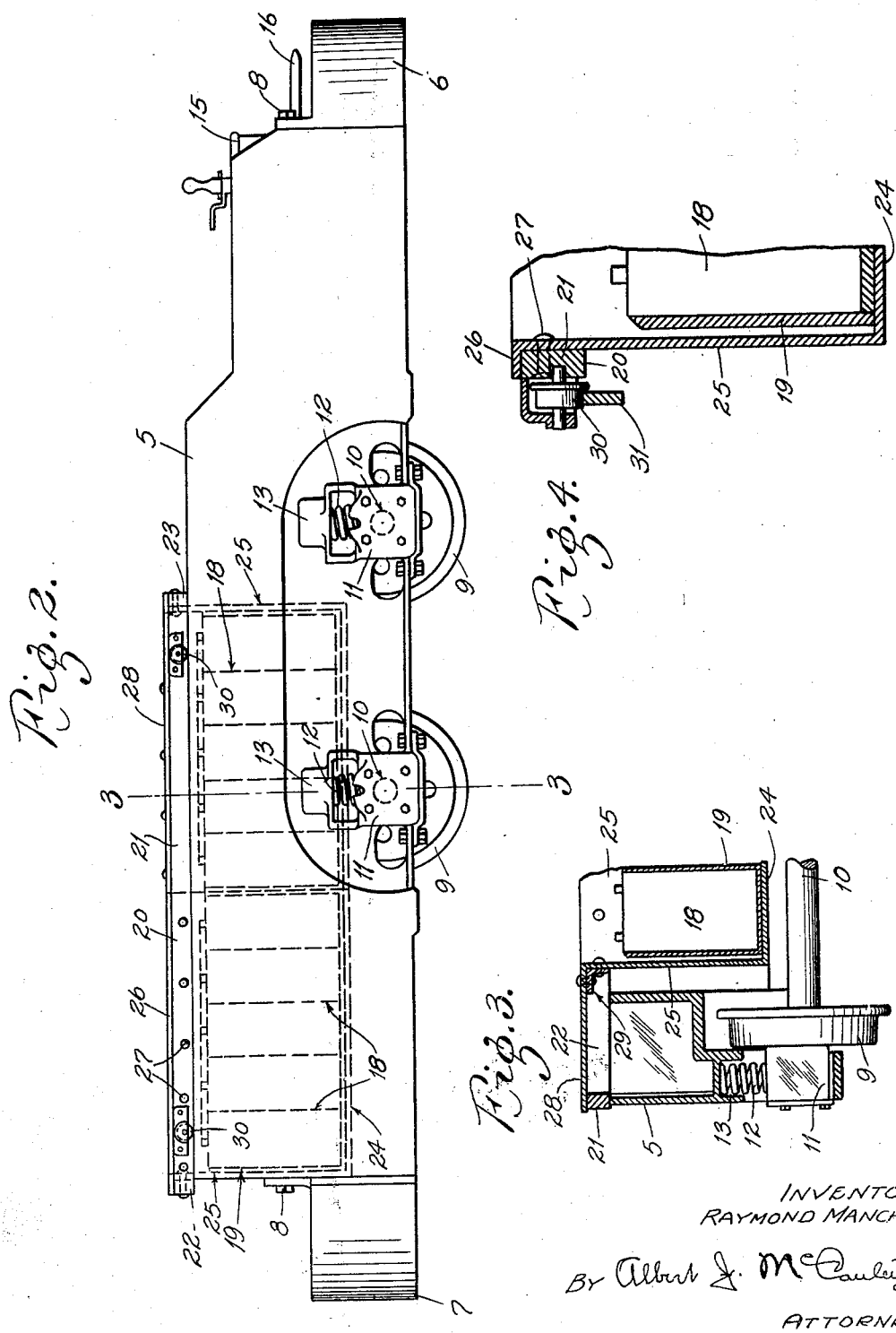

1,843,690

UNITED STATES PATENT OFFICE

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE

STORAGE BATTERY LOCOMOTIVE

Application filed May 15, 1930. Serial No. 452,563.

This invention relates to storage battery locomotives, and the novel features are especially advantageous in low type locomotives.

Prior to this invention, low type locomotives have been used in coal mines to draw coal cars through shallow tunnels, or passageways, that are very low. Heretofore, the storage battery has been surrounded by the chassis of the low type locomotive, but a battery of this kind consists of numerous cells connected together, and the entire battery is very heavy, the weight being, for example, about two tons.

In a high type locomotive, the storage battery lies above the chassis, and it can be readily removed for charging and replaced by a charged battery. Therefore, a high type locomotive can be used continuously, with the exception of the short intervals of time required to remove and replace the battery, but this is not true of the old low type locomotives.

Owing to the weight of the battery, and the time required to disconnect and connect the numerous cells, the batteries in low type locomotives have not been removed for charging. Prior to this invention it was necessary, or most economical, to charge the battery of a low type locomotive without removing it from the chassis.

Consequently, when such low type locomotives were in continuous service, one would be idle for the charging of the battery while another was in service. In other words, two of the old low type locomotives were required to obtain the continuous service of a single locomotive.

An object of the present invention is to enable one low type locomotive and two batteries to perform the work of two of the former low type locomotives.

More specifically stated, one of the objects is to produce a telescopic storage battery locomotive wherein a removable battery support is telescoped with the chassis, so that the discharged battery can be readily removed and replaced by a fully charged battery.

In the preferred form of the invention, the chassis may include the usual, or any suitable, side and end frame members, in addition to a structure large enough and having the strength required to support the battery, this structure being telescoped with the chassis to locate the battery in the desired low horizontal plane.

In removing the battery, the chassis may be moved with respect to the battery support, or said support may be moved independently of the chassis, so as to provide the telescopic motion which separates the chassis from the battery and its support. A similar operation is performed in substituting a charged battery for the discharged battery.

The bottom of the removable battery support may be lower than the tops of the wheels which support the chassis, and the telescopic support may be suspended from the chassis.

To illustrate one form of the invention, I have shown and will hereafter describe a telescopic locomotive wherein the battery support includes a bottom on which the battery is seated, and tension members extending upwardly from said bottom. In this form, the tension members are part of a suspension device, and they may be provided with abutments overlying and seated upon parts of the chassis to transmit the weight of the battery to the chassis.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a diagrammatical top view of a storage battery locomotive embodying the features of this invention.

Fig. 2 is a side view of the locomotive.

Fig. 3 is a section taken approximately on the lines 3—3 in Figs. 1 and 2.

Fig. 4 is a vertical section on a larger scale showing a portion of the battery support removed from the locomotive.

To illustrate one form of the invention, I have shown a storage battery locomotive including a chassis provided with side frame members 5, and end members 6 and 7 connecting the side members. This chassis constitutes the body of the low locomotive.

The end members 6 and 7 may be termed end sills and they are adapted to serve as bumpers. These end members may be provided with the usual, or any suitable, coupling devices (not shown) to couple the locomotive to a car, or to another locomotive. The top faces of the end members 6 and 7 are preferably lower than the tops of the side members 5, as shown in Fig. 2. Bolts 8, or other suitable fastening devices, may be used to connect the ends of the members 6 and 7 to the ends of the side members 5.

The chassis is supported on wheels 9 provided with axles 10 extending into journal boxes 11. Springs 12 are interposed between the journal boxes and spring pockets 13 formed in the side frame members 5, so the chassis frame is yieldingly supported on the journal boxes.

An operator's compartment 14 (Fig. 1) is formed in one end of the chassis, said compartment being provided with a controller 15 and an operator's seat 16 adjacent to the controller. I do not deem it necessary to show the brakes, nor the other equipment under the control of the operator, as the invention is not limited to such details.

The locomotive is driven by an electric motor 17, and the driving power may be transmitted from the motor to the wheels in any suitable manner.

The storage battery which energizes the motor consists of numerous cells 18 connected together in series and, as previously stated, the weight of the complete battery is very great, for example, about two tons.

As shown by Figures 1 and 2, the battery is telescoped with the chassis, and the tops of the cells are preferably lower than the top of this low type chassis, while the bottom of the battery is lower than the tops of the wheels, and preferably adjacent to the axles 10.

The cells 18 are arranged in rows and each row is located in a tray 19, but owing to the numerous electrical connections and the weight of the contents of each tray, the batteries of the older low type locomotives have not been removed for charging. Prior to the present invention, the batteries in locomotives of this type have been charged while confined in the locomotives, and this has resulted in the use of two complete locomotives whenever continuous service of one low type locomotive was required.

I will now refer to the telescopic structure in the chassis which permits a discharged battery to be easily and quickly removed and replaced by a charged battery.

20 designates a rectangular abutment frame comprising a pair of side bars 21 arranged longitudinally of the chassis and seated upon the top faces of the main side frame members 5, said longitudinal bars 21 being connected by transverse bars 22 and 23 to produce the rectangular frame.

The telescopic elements of the removable battery support may be suspended from said rectangular frame, and to illustrate this form of the invention, I have shown a battery compartment comprising a bottom 24 on which the battery is seated, and side wall members 25 extending upwardly from said bottom and secured to the rectangular frame.

The battery compartment produced by the wall members 24 and 25 may be approximately T-shaped, as shown in Fig. 1, so as to extend across the chassis at the front portion of the locomotive, where the vertical wall members 25 engage the frame members 21 and 22, as shown in Figures 1 and 4. At these parts of the structure, the wall members 25 have relatively narrow flanges 26 seated on the tops of the frame members 21 and 22, and rivets 27, or other suitable attaching means, may be employed to connect said vertical wall members 25 to said frame members 21 and 22.

However, at the intermediate portion of the chassis (Figs. 1 and 3), where the main side frames 5 are relatively wide to form the wheel housings, the battery compartment is narrower than at the front of the locomotive. As shown by Fig. 3, the vertical wall 25 at each wheel housing may be connected to a horizontal web, or flange, 28 which extends over one of the main side frame members 5, and this connection may be formed by an angle bar 29 attached to the top of the vertical wall 25 and also to the horizontal web, or flange, 28.

At the extreme rear of the approximately T-shaped battery compartment (Fig. 1), the vertical wall 25 of said compartment may be connected directly to the rear bar 23 of the rectangular frame, just as it is connected to the bars 21 and 22 at the front portions of the locomotive.

It will now be understood that the removable telescopic support shown in the drawings includes a bottom 24 on which the battery is seated, and that this bottom lies below the tops of the wheels 9 and preferably above the axles 10. Said bottom is preferably surrounded by the main frame of the chassis, so as to support the battery in the horizontal plane of this low chassis.

The vertical wall members 25 which connect the bottom 24 to the rectangular frame 20, may be termed tension members, or suspension members. They are suspended from the frame 20 and placed under tension in transmitting the weight of the battery to said frame. This removable frame 20 is located above and seated upon parts of the chassis to permit removal of the battery support.

In other words, this removable support is normally surrounded by and interlocked with the main frame of the low chassis, but the telescopic structure produced by the battery support and chassis frame, permits the entire battery to be lifted from the chassis, or, if desired, the telescopic motion can be obtained by lowering the chassis independently of the battery support.

Since the top of the front end sill 7 is relatively low (Fig. 2) it will be seen that if the battery support is lifted a slight distance, it will lie in a plane higher than said end sill 7, and a horizontal telescopic motion will then separate the locomotive from the battery.

The invention is not limited to any means for separating the telescopic elements of the locomotive structure, as this operation may be performed with the aid of jacks, or inclined tracks, and also by various other kinds of apparatus. However, the side frame members 21 of the removable structure may be equipped with wheels 30 adapted to support this structure at the charging station. This is suggested in Fig. 4 which shows one of the wheels 30 on a stationary track 31.

I claim:

1. A telescopic storage battery locomotive provided with a chassis frame constituting the body portion of the locomotive, a storage battery to energize the locomotive, and a removable support for said battery telescoped with said chassis frame to permit removal of the battery.

2. A telescopic storage battery locomotive provided with a unitary frame for both the chassis and body of the locomotive, a storage battery to energize the locomotive, and a removable support for said battery telescoped with said unitary frame to permit removal of the battery, the bottom of said removable battery support being lower than the tops of the wheels of the locomotive.

3. A telescopic storage battery locomotive provided with a chassis constituting the body portion of the locomotive, a storage battery to energize the locomotive, and a removable support for said battery telescoped with said chassis to permit removal of battery, said removable battery support being suspended from said chassis.

4. A low type storage battery locomotive provided wth a chassis constituting the body portion of the locomotive, a storage battery to energize the locomotive, said battery being telescoped with said chassis, and a removable support for said telescoped battery permitting removal and replacement thereof, said removable support being telescoped with said chassis.

5. A low type storage battery locomotive provided with a locomotive body and chassis united with each other to locate the body and chassis in substantially the same plane, a storage battery to energize the locomotive, said battery being telescoped with said unitary body and chassis, and a removable support for said telescoped battery permitting removal and replacement thereof, said removable support being telescoped with said unitary body and chassis, and the bottom of said removable support being lower than the tops of the wheels of the locomotive.

6. A storage battery locomotive provided with a chassis having side members forming the sides of the locomotive body, a storage battery to energize the locomotive, said battery being telescoped with the chassis so as to lie between the sides of said chassis, and a removable support for said battery permitting removal and replacement thereof, said removable support being telescoped with and suspended from said chassis.

7. A storage battery locomotive provided with a chassis having side members forming the sides of the locomotive body, a storage battery to energize the locomotive, said battery being telescoped with the chassis so as to lie between the sides of said chassis, and a removable support for said battery permitting removal and replacement thereof, said removable support being telescoped with and suspended from said chassis, the bottom of said removable battery support being lower than the tops of the wheels on which the chassis is supported.

8. A storage battery locomotive provided with a chassis constituting the body portion of the locomotive, a storage battery to energize the locomotive, said battery being telescoped with said chassis, and a removable support for said battery permitting removal and replacement thereof, said removable support comprising a bottom below the battery and tension members extending upwardly from said bottom, and said tension members being suspended from said chassis.

9. A storage battery locomotive provided with a chassis having side members forming the sides of the locomotive body, a storage battery to energize the locomotive, said battery being telescoped with said chassis, and a removable support for said battery permitting removal and replacement thereof, said removable support comprising a bottom below the battery and tension members extending upwardly from said bottom, said tension members being between the sides of the chassis and provided with abutments seated upon parts of the chassis to transmit the weight of the battery to the chassis.

10. A telescopic storage battery locomotive provided with a chassis constituting the body portion of the locomotive, a storage battery to energize the locomotive, and a removable support for said battery telescoped with said chassis to permit removal of the battery, said removable battery support being confined between the sides and an end of the chassis, and the parts being so arranged that the battery and its support may be located in a plane higher than said end of the chassis, and then telescoped horizontally over said end to separate the battery from the locomotive.

11. A low type storage battery locomotive provided with a chassis constituting the body of the low locomotive, a storage battery to energize the locomotive, said battery being telescoped with the chassis of the locomotive so as to extend into the low horizontal plane of said chassis, and a removable support for said telescoped battery permitting removal and replacement thereof, said chassis having seats for said removable battery support, and said removable support being suspended upon said seats to permit removal of the suspended support and battery.

12. A low type storage battery locomotive provided with a chassis constituting the body of the low locomotive, a storage battery to energize the locomotive, and a support for said battery removably secured to the locomotive to permit removal and replacement of the cells of the battery, said removable battery support being telescoped with the chassis of the locomotive to lie in the low horizontal plane of the body and chassis, the upper portion of said removable battery support being confined between the side frame members of the chassis, the bottom of said removable battery support being lower than the tops of the wheels of the locomtive, said chassis having seats on which said battery support is removably mounted to permit removal of the support in removing the battery.

13. A low type storage battery locomotive provided with a chassis constituting the body of the low locomotive, a storage battery to energize the locomotive, and a support for said battery removably secured to the locomotive to permit removal and replacement of the battery, said removable support being surrounded by and interlocked with said chassis, the bottom of said support being lower than the tops of the wheels which support the chassis, and the upper portion of said support being provided with abutments seated over portions of the chassis to support the battery.

14. A low type storage battery locomotive provided with a chassis constituting the body of the low locomotive, a storage battery to energize the locomotive, and a support for said battery removably secured to the locomotive to permit removal and replacement of the battery, said removable support being surrounded by and interlocked with said chassis, the bottom of said support being lower than the tops of the wheels which support the chassis, and the upper portion of said support being provided with abutments seated over portions of the chassis to support the battery, and said abutments being removable from said portions of the chassis to permit telescoping of the battery and chassis in removing and replacing the battery.

15. A telescopic storage battery locomotive provided with a chassis constituting the body portion of the locomotive, a storage battery comprising trays of cells to energize the locomotive, and a removable support including a compartment containing a plurality of said trays of cells, said removable support being telescoped with the chassis.

16. A telescopic storage battery locomotive provided with a low type chassis constituting the body portion of the locomotive, a storage battery to energize the locomotive, said storage battery including trays of cells electrically connected together, and a removable support comprising supporting members telescoped with different portions of the chassis and supporting said trays of cells, said removable supporting members being confined between the sides of the chassis, so as to locate the bottoms of said trays of cells in positions lower than the tops of the wheels of the locomotive, and said chassis being provided with seats upon which said supporting members are removably mounted for telescopic motion in removing the battery from the chassis.

17. A low type storage battery locomotive comprising a low body provided with a storage battery and an operator's station in substantially the same horizontal plane, and a removable support for the battery telescoped with said low body to permit removal and replacement of the battery.

18. A low type storage battery locomotive comprising a low body having at one of its end portions an operator's station provided with means to control the locomotive, and a storage battery including cells in the other end portion of said body, and a removable support for the battery telescoped with said low body to permit removal and replacement of the battery.

19. A low telescopic storage battery locomotive comprising a locomotive body and chassis united with each other to locate said body and chassis in substantially the same horizontal plane, said unitary body and chassis being provided with bumpers at its ends, a storage battery to energize the locomotive and an operator's station in said unitary body and chassis, and a removable support for said battery telescoped with said unitary body and chassis to permit removal and replacement of the battery.

In testimony that I claim the foregoing I hereunto affix my signature.

RAYMOND MANCHA.